Patented May 2, 1933

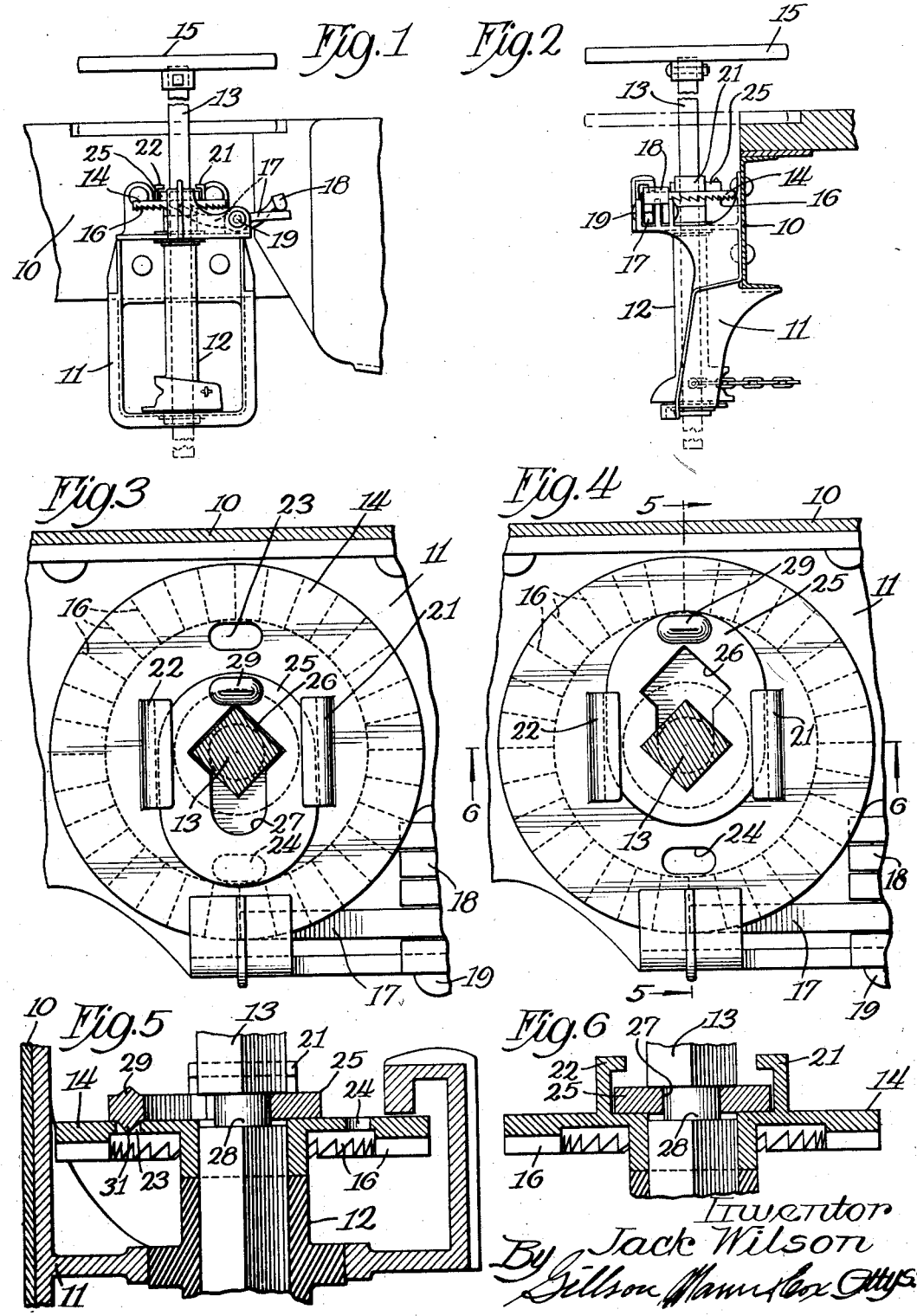

1,906,687

UNITED STATES PATENT OFFICE

JACK WILSON, OF CHICAGO, ILLINOIS, ASSIGNOR TO UNIVERSAL DRAFT GEAR ATTACHMENT CO., OF CHICAGO, ILLINOIS, A CORPORATION OF ILLINOIS

DROP BRAKE STAFF

Application filed September 29, 1930. Serial No. 484,945.

This invention has for its objects to provide means for holding the staff of the hand brake in elevated position and means for releasing the staff which will be simple, easy to manufacture, rugged, and able to operate under accumulations of dirt, ice and snow.

These and other objects and advantages will become apparent as the disclosure proceeds and the description is read in conjunction with the accompanying drawing, in which Fig. 1 is an elevation of my improved brake staff as applied to a railway car, the end sill of the car and a portion of the coupler being shown;

Fig. 2 is a side view of the elevation shown in Fig. 1 with the portions of the car shown in cross section;

Fig. 3 is a top view of the ratchet wheel showing the locking link in the position assumed when the staff is lowered;

Fig. 4 illustrates the position of the link with the brake staff raised and locked in raised position by the link;

Fig. 5 is a section through the aperture shown in Fig. 4 on the line 5—5; and

Fig. 6 is a section through the same parts, shown on the line 6—6.

It has previously been customary to provide a latch at the lower end of the brake staff bracket which will drop under the staff to hold it in an elevated position. This is an inconvenient location for the operator and as a consequence, lever or treadle attachments have been added to the latch so that it may be readily disengaged. In winter, when the mechanism freezes, frequently, the trainmen pound the treadles to break the latch loose; often this rough treatment breaks important parts.

In order to obviate these difficulties I apply a single part which is readily accessible to the brakeman and may be easily broken loose if stuck without inflicting any damage to the hand brake assembly.

With reference to Fig. 1, the car end sill 10 supports a bracket 11 in which is journaled a winding drum 12 having a square or polygonal longitudinal bore. The shaft, which closely fits this bore forms the brake staff 13 and is free to slide both through the bore of the winding drum and through a square or suitably shaped hole in the ratchet wheel 14. The usual hand wheel 15 is carried at the upper end of the brake staff.

In this particular instance, I show a ratchet wheel of the dirt-proof type which is characterized by the fact that the teeth 16 of the ratchet wheel point downwards. They are engaged by the dog or pawl 17 which is pulled into engagement with them by the counterweight 18 mounted on the pivot 19. This counterweight when swung to the position shown in Fig. 1 engages the outer or free end of the dog for holding the same in engagement with the teeth and when swung to the opposite side of the pivot 19, the weight of the latch will cause it to become disengaged from the ratchet teeth, as is common in such constructions.

Suitable means are provided for holding the brake staff in elevated position. Preferably this means is mounted in an accessible position. As shown, it is mounted on the ratchet wheel, and its construction and arrangement will now be described. The upper face of the ratchet wheel, as shown in Figs. 3, 4, 5 and 6 carries two L-shaped projections or guides 21 and 22 extending upwardly parallel to the axis of the brake staff and then inwardly. As best shown in Figs. 5 and 6, the gear is formed with two holes 23 and 24 which pass entirely through the metal and are located between the center of the wheel and the inner edge of the teeth 16.

Also, as shown in the figures, a sliding link 25 is placed so that it is held in position by the projections 21 and 22 which form guides for its movement. An aperture is cut through the link which has two sections, an enlarged or free section 26 formed to the outer configuration of the brake staff and giving clearance therefor, and a locking section 27 which is designed to engage the slot 28 cut into the brake staff. The slot is cut circumferentially around the brake staff and may be of any suitable depth. In the construction shown, the depth is such that the faces of the brake staff occupy planes tangent to the inscribed circle.

The link 25, as is shown in Fig. 5, carries two V-shaped projections 29 and 31 extending in either direction from its outer faces. These projections are identical.

Since two holes are provided in the face of the gear 23 and 24, it is impossible to put the link in place in such a manner that a projection will not engage a hole. As shown in Fig. 5, if the link is installed upside down, the projection 29 would engage the hole 23 instead of the projection 31 engaging the hole as shown. If reversed right for left, the projection 31 would engage the hole 24 and if reversed and turned over, the projection 29 would engage the hole 24. This assures a proper assembly of the mechanism even by the most inexpert.

The operation is as follows: Normally with no load in place upon a flat car, the brake staff is maintained in a raised position. The staff is pulled up and the locking link 25 is pushed over so that the walls of the locking portion 27 of the link engage the slot 28 cut in the brake staff. At that time, the projection 31 engages the hole 23. The weight of the hand wheel and staff falling upon the link maintains it in place. To lower the staff, the link is simply pushed over in the other direction, the release portion 26 of the link gives clearance for the staff and it is dropped.

It is obvious that the holes 23 and 24 need not go all the way through the gear. They may merely be depressions sufficiently deep to receive the projections on the link. I prefer, however, that the holes 23 and 24 should extend entirely through the ratchet wheel, since when this is the case, dirt will not lodge in them nor water collect therein and freeze.

What I claim, therefore, is:

1. A lock for drop brake staffs comprising in combination a brake staff having flattened sides, a ratchet wheel having apertures therein, a latch sliding upon the face of the ratchet wheel and having detents thereon engaging in the apertures of the wheel, lugs upon the wheel engaging the side walls of the latch, two connecting apertures in the latch, one adapted to give clearance to the brake staff, and a notch in the staff engageable by the latch to maintain the staff in an exended position.

2. In a drop staff brake assembly including a latch, means to retain the latch and to prevent dirt from rendering the latch inoperative, comprising a ratchet wheel having two upstanding lugs engaging the side walls of the latch, and an aperture through the wheel which may be engaged by a detent on the latch.

3. A ratchet wheel for a drop brake operating mechanism comprising a body portion, an annular row of teeth on the lower face of said body portion, and latch guides extending upwardly from the upper face of said body portion, said body portion having openings therein.

In testimony whereof I affix my signature.

JACK WILSON.